(12) United States Patent
Qi et al.

(10) Patent No.: US 8,034,291 B2
(45) Date of Patent: Oct. 11, 2011

(54) FEEDBACK CONTROL IN SELECTIVE CATALYTIC REDUCTION

(75) Inventors: Baohua Qi, Columbus, IN (US); Mickey R. McDaniel, Greenwood, IN (US); Hakeem Ogunleye, Columbus, IN (US); Clyde Xi, Columbus, IN (US); Hongbin Ma, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 633 days.

(21) Appl. No.: 12/018,583

(22) Filed: Jan. 23, 2008

(65) Prior Publication Data
US 2009/0185954 A1 Jul. 23, 2009

(51) Int. Cl.
*G01N 21/00* (2006.01)
(52) U.S. Cl. .......................................... 422/62
(58) Field of Classification Search ............... 422/62
See application file for complete search history.

(56) References Cited

U.S. PATENT DOCUMENTS

| 4,473,536 A | 9/1984 | Carberg et al. |
| 2007/0220865 A1 | 9/2007 | Cunningham et al. |

FOREIGN PATENT DOCUMENTS

| JP | 2000-220438 A | 8/2000 |
| KR | 10-2003-0076976 A | 9/2003 |

OTHER PUBLICATIONS

International Search Report of PCT/US2009/030738, dated Aug. 25, 2009.
Written Opinion of the International Searching Authority of PCT/US2009/030798, dated Aug. 25, 2009.

*Primary Examiner* — Bobby Ramdhanie
(74) *Attorney, Agent, or Firm* — Hamre, Schumann, Mueller & Larson, P.C.

(57) ABSTRACT

An apparatus for introducing a reductant into an exhaust system is described. The apparatus includes a controller that generates a resulting dosing command used as an instruction to release an amount of reductant into the exhaust system. The controller includes a feedback control module that generates a weighing factor. The weighing factor is configured to be applied to a lower limit dosing command and configured to be applied to an upper limit dosing command, where the lower and upper limit dosing commands converted by the weighing factor are used by the controller to generate the resulting dosing command.

24 Claims, 10 Drawing Sheets

FEEDBACK CONTROL IN SELECTIVE CATALYTIC REDUCTION

FIELD

A control is disclosed that can optimize performance and dosing economy of a reductant used with selective catalyst reduction (SCR) devices, such as in combustion exhaust streams. Particularly, a feedback control is configured to generate a command for a dosing rate of reductant that at least meets deNO$_x$ targets for a system, while also being limited within a maximum allowed dosing rate determined by the maximum allowed NH$_3$ slip.

BACKGROUND

Selective catalyst reduction (SCR) devices are widely known and used, and are particularly used in combustion exhaust streams of diesel engines, as one example.

To meet Environmental Protection Agency (EPA) requirements, SCR devices are used to introduce a reductant which reduces NO$_x$ generated in engine exhaust systems. Along with SCR devices, sensory and feedback control capabilities have been employed to detect the presence of NO$_x$ and to introduce a reductant, based on the NO$_x$ detected by the control. The introduced reductant reacts with the NO$_x$ to facilitate its reduction. Feedback control modules can greatly improve NO$_x$ reduction or "deNO$_x$" performance.

However, due to cross-sensitivity of sensors employed in known feedback control modules, NH$_3$ (e.g. ammonia) that is present in the system also is read as NO$_x$ by the sensor (known as an "NH$_3$ slip"). The NH$_3$ slip is unwanted emissions caused by limited catalyst capability. When the control system generates a certain amount of NH$_3$ slip, the NO$_x$ sensor reports the NH$_3$ slip as NO$_x$ due to its dual sensitivity to NH$_3$. As electrochemical sensors are typically used in such SCR devices in order to keep costs down, rather than optical sensors which are significantly more expensive (e.g. Fourier Transform Infrared Spectroscopy (FTIR) sensors), such cross-sensitivity of the sensor has been known to occur. The incorrect sensing information triggers false positive feedback, causing reductant introduction into the system at higher dosages, which can lead to an unstable system and reductant waste.

Thus, improvements can still be made to SCR devices, particularly those using a feedback control and improvements can still be made to limit overall reductant dosing.

SUMMARY

The following technical disclosure describes an improved dosing control that can help optimize reduction of NO$_x$ in engine exhaust material, while limiting introduction of a reductant into an exhaust system, and while meeting dosing requirements, for example EPA dose requirements. Generally, the dosing control is configured to generate a resulting dosing command through a weighing factor, where the weighing factor is applied to process upper ("limit") and lower (feed-forward) limit dosing commands to generate the resulting dosing command.

In one embodiment, an apparatus for introducing a reductant into an exhaust system includes at least one sensor configured to detect NO$_x$ produced during engine combustion, and includes a controller operatively connected with the sensor. The controller is configured to receive an output of NO$_x$ detected by the sensor. The controller is configured to process the output from the sensor and generate a resulting dosing command having an instruction to introduce a reductant into the exhaust system. The resulting dosing command is generated with a weighing factor and from a lower limit dosing command (feed-forward dosing command), which is determined by emission requirements or targets, and from an upper limit dosing command ("limit" dosing command), which is limited by the maximum allowed NH$_3$ slips. The weighing factor is configured to be applied to the lower and upper limit dosing commands, such that the weighing factor processes the lower and upper limit dosing commands into end values of the resulting dosing command.

In one embodiment, the controller includes a feedback control module configured to receive the output from the sensor and generate the weighing factor. In yet another embodiment, the feedback control module is configured to only adjust the weighing factor and apply it to the lower and upper limit dosing commands for processing.

In one embodiment, the controller is configured to periodically update the resulting dosing command, where the sensor is configured to periodically detect NO$_x$ produced and the controller periodically generates an updated resulting dosing command.

As one example only, the dosing control described is useful with selective catalytic reduction devices for combustion engine exhaust systems. For instance, at least one sensor is operatively connected to an outlet of a selective catalyst reduction device. A doser is operatively connected to the controller and connected to the selective catalyst reduction device, where the doser is configured to receive the resulting dosing command from the controller and configured to introduce the reductant into the exhaust system at the outlet of the selective catalyst reduction device. The amount of reductant introduced is based on the resulting dosing command received from the controller.

In another embodiment, a method of controlling introduction of a reductant into an exhaust system includes calculating a lower limit dosing command and calculating an upper limit dosing command. An emission level is calculated based upon a detected NO$_x$ output and is compared to an emission target, where an emission error thereby is generated. Through a feedback controller, a weighing factor is generated based on the emission error. A resulting dosing command is calculated using the lower (feed-forward) and upper ("limit") limit dosing commands together with the weighing factor.

Other features of novelty and various advantages of the disclosure are pointed out in the following detailed description. For a better understanding of such features and their advantages, reference should also be made to the drawings which form a further part hereof, and to the accompanying descriptive matter, in which there are illustrated and described various embodiments of the inventive concepts.

DETAILED DESCRIPTION

Generally, a dosing control as described herein includes a configuration to generate a resulting dosing command through a weighing factor, where the weighing factor is applied to upper and lower limit dosing commands to generate end values of the resulting dosing command. The control can provide optimized reduction of $NO_x$ in engine exhaust material, without excessive introduction of a reductant into an exhaust system, and while still meeting needed reductant doses, such given by EPA requirements.

A unique control scheme is presented, where the dosing command generation includes a feed-forward command (i.e. lower limit) generation and a limit command generation (i.e. upper limit), where both commands are processed using the weighing factor. For example, in feed-forward command generation the necessary amount of dosing for meeting emission requirements or targets is generated (i.e. EPA requirements), while in limit command generation the maximum allowed dosing rate is provided, which is limited by the maximum allowed $NH_3$ slip. The weighing factor is generated for adjusting the resulting dosing command to be within dosing rate values generated in the feed-forward command generation and the limit command generation. Thereby, a tradeoff is made between the best performance (limit command generation) and the best urea dosing economy (feed-forward command generation) by using the weighing factor.

As one example, a $NO_x$ slip value acquired from a $NO_x$ sensor downstream of an SCR device is screened, and a trustable $NO_x$ slip value is evaluated for generating the weighing factor. Such a control helps to avoid system instabilities, since a weighing factor rather than the control system gains is modified, and an adjustment range of the resulting dosing command is limited within the dosing commands generated in the feed-forward command generation and the "limit" command generation while using the weighing factor. Using such a control design, the necessary dosing command is provided (i.e. EPA standards), while $deNO_x$ performance and dosing economy are optimized. It will be appreciated that the control described herein can be easily calibrated to function with multiple SCR configurations and engines.

Figure 1:
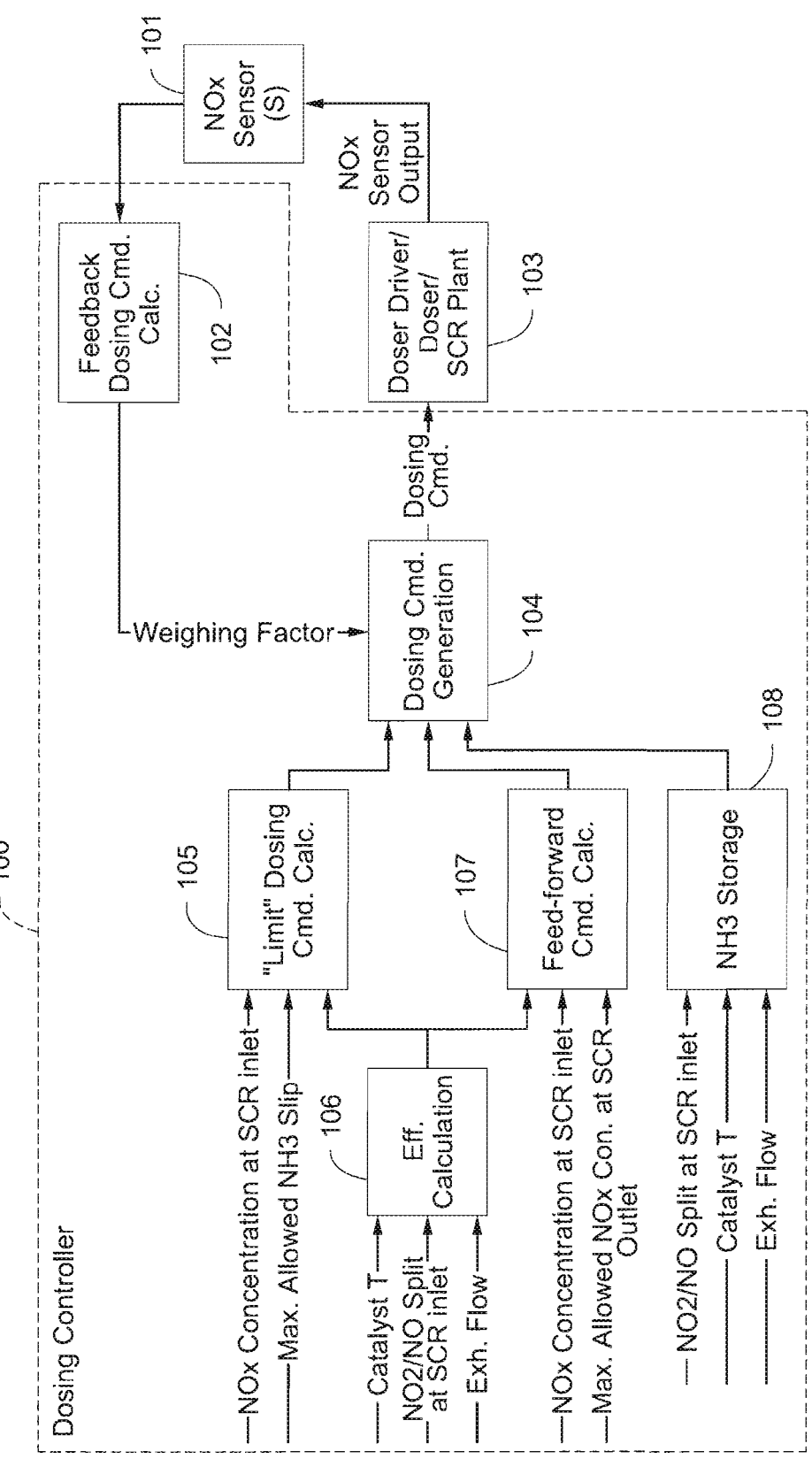
FIG. 1 is a schematic view of one embodiment of a dosing control apparatus being used with one schematic example a system for combustion exhaust stream including an SCR doser driver/doser device.

FIGS. 1-9 generally illustrate one non-limiting embodiment of an apparatus for generating a dosing command for introducing a reductant, for example, into a combustion engine exhaust system. As one particular application, the apparatus described herein is useful for introducing a reductant to reduce $NO_x$ exhaust material generated by an exhaust system employing a selective catalyst device. As shown, FIG. 1 is a schematic view of one embodiment of the apparatus as a dosing control. In one embodiment, the dosing control is shown incorporated with a selective catalyst reduction device (Doser Driver/Doser/SCR Plant) 103. The apparatus includes a sensor S (101) that detects $NO_x$ at an outlet of a SCR device, and that outputs the $NO_x$ detection to a dosing controller 100. The controller processes the feedback values from the sensor S (101) and calculates a weighing factor (Feedback Dosing Cmd. Calc.) to be used for generating the resulting dosing command in a dosing command generation module 104 (Dosing Cmd. Generation).

In one embodiment, the sensor S (101) and weighing factor generation are configured in a feedback control module 102 (Feedback Dosing Cmd. Calc.), where a $NO_x$ level output from the selective catalyst device is used to generate the weighing factor for adjusting the resulting dosing command. A dosing command generation module 104 (Dosing Command Generation) uses the weighing factor to process an upper limit dosing command generated in a module 105 ("Limit" Dosing Cmd. Calc.) and a lower limit dosing command provided by a module 107 (Feed Forward Cmd. Calc.). In one embodiment, the upper limit dosing command is generated by using inputs that include the maximum allowed $NH_3$ slips (Max. Allowed $NH_3$ Slip) and the $NO_x$ concentration at the selective catalyst reduction device ($NO_x$ Concentration at SCR inlet). In one embodiment, the lower limit dosing command is generated by using inputs that include the maximum allowed $NO_x$ concentration at an outlet of a selective catalyst reduction device (Max. Allowed $NO_x$ Con. At SCR Outlet) and the $NO_x$ concentration at an inlet of the selective catalyst reduction device (NOx Concentration at SCR inlet).

As further shown in FIG. 1, the dosing control may also use additional inputs for generating the resulting dosing command. For example, such inputs may include, but are not limited to, a catalyst NOx conversion efficiency (deNOx efficiency) calculation (module 106, Eff. Calculation) which may be applied as an input in the generation of each of the upper limit and lower limit dosing commands. In one embodiment, the deNOx efficiency calculation is dependent upon various parameters that include, for example, (1) the temperature (Catalyst T) of the selective catalyst reduction device, (2) exhaust flow rate/space velocity (Exh. Flow), and (3) the split ratio of NO2 to NO at SCR inlet ($NO_2$/NO Split at SCR inlet). Additionally, (4) the $NH_3$ concentration or dosing level, and (5) overall $NO_x$ level or $NO_x$ concentration at the inlet of the selective catalyst reduction (SCR) device, can also be included in efficiency calculation. Catalyst temperature affects both SCR reaction types and reaction rate, while exhaust flow changes SCR reaction rate by changing exhaust air residence time in catalyst. At a given catalyst temperature and exhaust flow, especially at low temperature, the SCR device is at its highest efficiency when the $NO_2$/NO ratio is 1:1 (fast-SCR). When NO is dominant, the SCR device typically operates at its standard efficiency (standard-SCR). However, if there is more $NO_2$ than NO, then the SCR device may become less efficient. Such factors are known to affect $deNO_x$ and $deNH_3$ efficiency calculations.

By using the weighing factor, the resulting dosing command is calculated based on the upper limit and lower limit dosing commands (described in detail below). The resulting dosing command then is used as an instruction to the SCR device so that a doser and doser driver may introduce a reductant into the exhaust system. In one embodiment, the reductant to be introduced is urea. It will be appreciated to one of skill in the art, however, that other known reductants may be employed if desired or necessary.

As another example of an additional input (FIG. 1), the control may include a value of $NH_3$ storage compensation (NH3 Storage) module 108. The $NH_3$ storage compensation value may include inputs such as the temperature of the SCR device (Catalyst T), exhaust flow (Exh. Flow), and the $NO_2$/NO ratio or the $NO_x$ split at the SCR device inlet.

Figure 2:
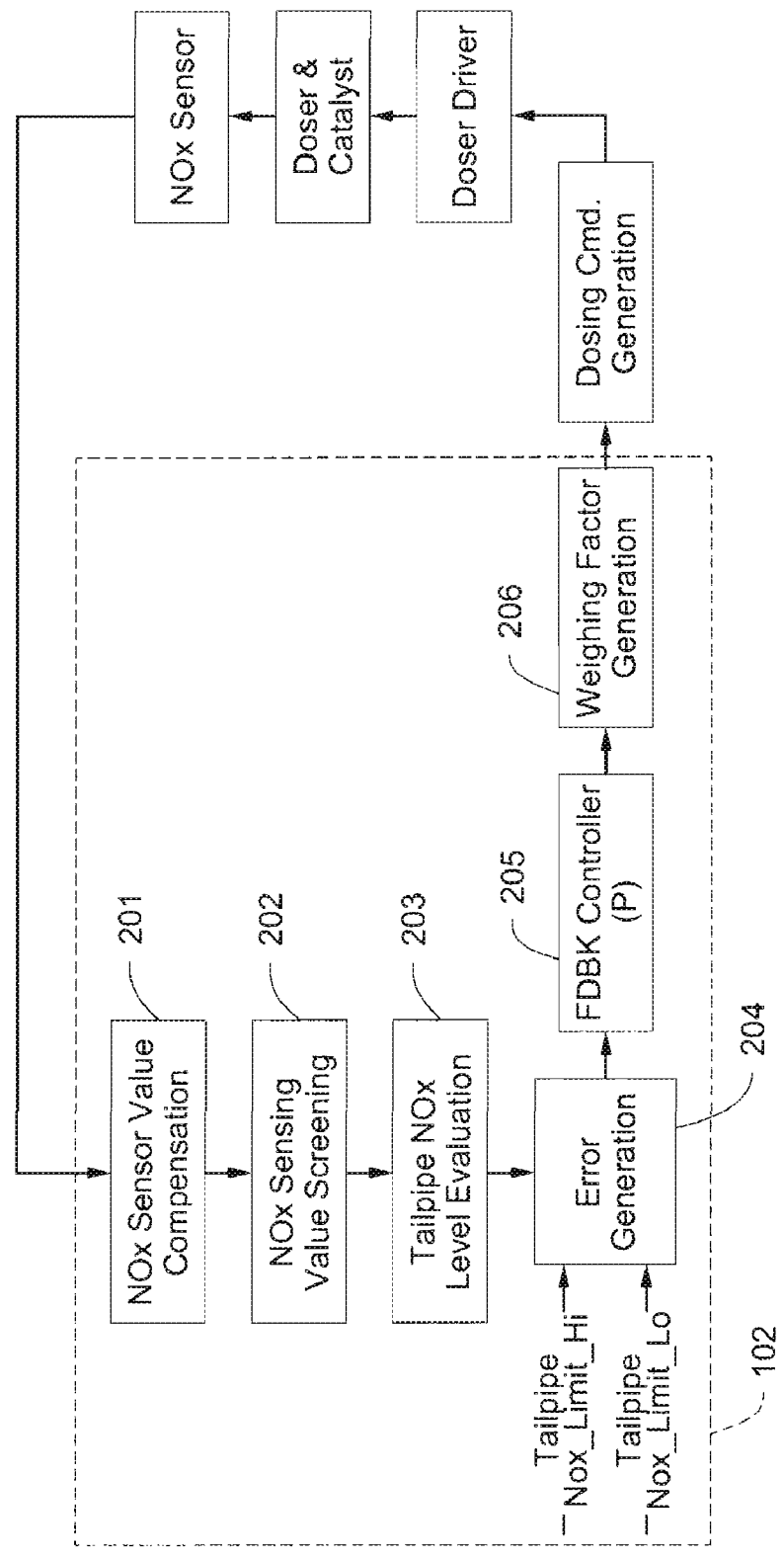
FIG. 2 is a schematic view for one embodiment of a feedback control module in the dosing control apparatus shown in FIG. 1.

FIG. 2 is a schematic view of one embodiment of the feedback control module 102 in the dosing control depicted in FIG. 1. Generally, the feedback control module does not directly control the resulting dosing command. Rather, the feedback control module modifies the weighing factor so that the weighing factor can be used to process the upper and lower limit dosing commands in generating the resulting dosing command.

The feedback control module includes a block 201 that provides compensation for the $NO_x$ sensor value (NOx Sensor Value Compensation). In one embodiment, the compensation is to address the effects of cross-sensitivity and pressure. As one example, the following formula (Equation 1) represents the cross-sensitivity to $NH_3$ and $NO_2$ concentration:

$$NOx_{Act}^P = NOx_{Sen}^P - k_{NH3}NH_3 + k_{NO2}NO_2$$

where $NOx_{Act}^P$ represents actual $NO_x$ parts per million (ppm) value at pressure P;

$NOx_{Sen}^P$ represents $NO_x$ sensor ppm value at pressure P;

$k_{NH3}$ represents coefficient of $NH_3$ compensation;

$NH_3$ represents $NH_3$ ppm value;

$k_{NO2}$ represents coefficient of $NO_2$ compensation, and $NO_2$ represents $NO_2$ ppm value.

In certain embodiments, $k_{NH3}=0.9$ as an example and $k_{NO2}=0.9$ as an example.

In carrying out compensation of the $NO_x$ sensor value, the feedback control module may also be configured to provide pressure compensation. Cross-sensitivity compensation coefficient values and pressure compensation formula are determined by characteristics of the $NO_x$ sensor.

Figure 3:
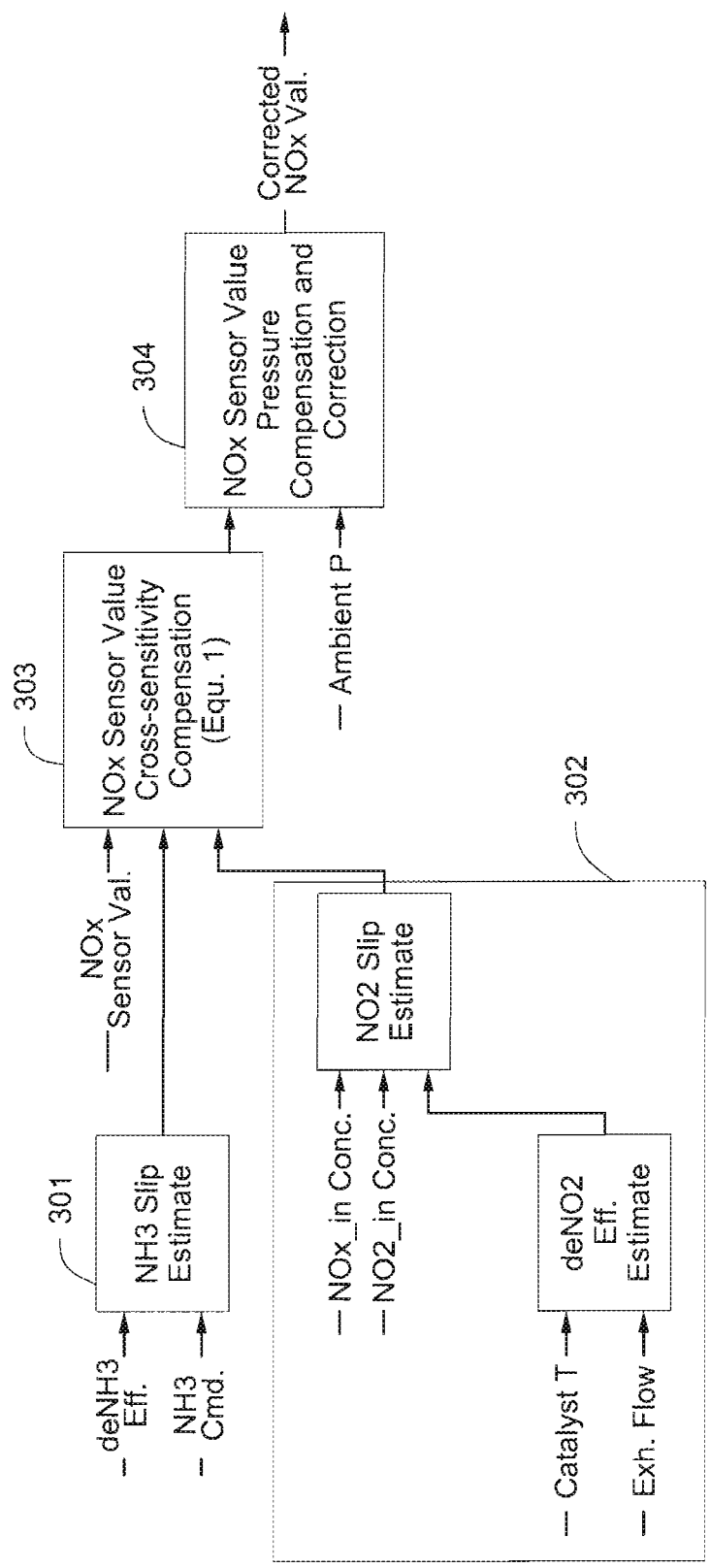
FIG. 3 is a schematic view of one embodiment of a NO$_x$ sensor value compensation component of the feedback control module of FIG. 2.

FIG. 3 shows a schematic configuration for correction of the sensing value from a tailpipe $NO_x$ sensor (i.e. SCR device outlet). The sensing value correction includes a cross-sensitivity compensation (block 303), which is calculated based on $NH_3$ slip and $NO_2$ slip estimated in block 301 and 302 respectively, and pressure compensation in block 304 using ambient pressure (P) information.

$NH_3$ slip is estimated using urea dosing command (NH3 Cmd.) and $deNH_3$ efficiency (deNH3 Eff.), which is calculated in the upper "limit" dosing command generation.

To estimate $NO_2$ slip, the SCR reactions are simplified using the following assumptions:

Assumption 1. Only two reactions: fast-SCR reaction and standard-SCR reaction are considered;

Assumption 2. Only NO and $NO_2$ exist in exhaust $NO_x$ to SCR;

Assumption 3. Fast-SCR reaction has absolute priority in the two SCR reactions (i.e., standard-SCR only happens when there is no fast-SCR).

Based on these assumptions, the $NO_2$ slip is calculated using the equations:

when $C_{NH3}eff_{deNH3} \leq \min(C_{NO}, C_{NO2})eff_{fast\_SCR}\beta$, $C_{NO2}^{slip} = \min(C_{NO}, C_{NO2}) - C_{NH3}eff_{deNH3}/\beta$;

when $C_{NH3}eff_{deNH3} > C_{NO2}eff_{fast\_SCR}\beta$ and $C_{NO2} \leq C_{NO}$, $C_{NO2}^{slip} = C_{NO2}(1 - eff_{fast\_SCR})$;

when $C_{NH3}eff_{deNH3} > C_{NO}eff_{fast\_SCR}\beta$ and $C_{NO2} > C_{NO}$, $C_{NO2}^{slip} = (C_{NO2} - C_{NO}eff_{fast\_SCR})(1 - eff_{deNO2})$, where $eff_{deNO2} = (C_{NH3}eff_{deNH3}/\beta - C_{NO}eff_{fast\_SCR})/(C_{NO2} - C_{NO})$.

In the equations, $C_{NO2}$ is $NO_2$ concentration at the SCR inlet; $C_{NO}$ is NO concentration at the SCR inlet; $C_{NH3}$, is $NH_3$ concentration at the SCR inlet (dosing cmd.), and $C_{NO2}^{slip}$ is $NO_2$ slip at tailpipe; $eff_{fast\_SCR}$ is $NO_x$ conversion efficiency for fast SCR reaction; $eff_{deNH3}$ is $NH_3$ conversion efficiency; $eff_{deNO2}$ is $NO_2$ conversion efficiency, and $\beta$ is $NH_3$ to $NO_x$ reaction ratio.

Turning back to FIG. 2, once compensation of the $NO_x$ sensor value has been performed, the feedback control module is configured to provide for screening of the $NO_x$ sensing value in a block 202 (NOx Sensing Value Screening). In some embodiments, certain $NO_x$ sensing values are used in the feedback control module. For example, NOx sensing values at a steady state may be used in the feedback control module, $NO_x$ sensing values within a trustable range may be used in the feedback control module, $NO_x$ sensing values with a valid compensation may be used in the feedback control module, and average $NO_x$ sensing values may be used in the feedback control module.

Accurate screening of the $NO_x$ sensing value is dependent on various conditions. Such conditions which may affect accurate screening of the $NO_x$ sensing value include, for example, $NO_x$ value changing rate and SCR bed temperature. When the SCR bed temperature is too low or too high, such as due to the error and uncertainties in estimating $NH_3$ slip and $NO_2$ slip, $NO_x$ value compensation may not be accurate, thereby affecting $NO_x$ sensing value accuracy. Further, where there exists a large difference between SCR inlet temperature and SCR outlet temperature (i.e. a large difference between exhaust gas temperature and bed temperature), uncertainty may be induced in estimating catalyst capability, which may affect the accuracy of the $NO_x$ sensing value.

Other conditions which may affect accurate $NO_x$ sensing values include exhaust flow rate. Where the exhaust flow is too low, urea distribution may be non-uniform, therefore affecting $NO_x$ sensing accuracy. Where the exhaust flow is too high, due to higher uncertainty in the exhaust flow sensor, estimates of $NH_3$ slip and $NO_2$ slip could be affected resulting in deterioration of $NO_x$ sensing accuracy.

Still other conditions which may have an affect on $NO_x$ sensing value accuracy include, $NO_x$ concentration, where a $NO_x$ sensing value may only be accurate within a certain $NO_x$ concentration range. Likewise, accurate sensing of $NO_x$ value may depend upon other operation conditions, such as ambient pressure, and the presence of $NH_3$ slips and $NO_2$ slips.

Once screening of the $NO_x$ sensing value has been performed, the feedback control module is configured to provide evaluation of the $NO_x$ level. In some embodiments, evaluation of the $NO_x$ level includes evaluation of the tailpipe $NO_x$ level (Block 203, Tailpipe NOx Level Evaluation). One purpose of SCR device control is to limit the $NO_x$ level at the tailpipe within a range, while considering dosing economy, performance, and sensitivity to sensor uncertainties. The feedback control module is configured to perform $NO_x$ level evaluation by calculating the average $NO_x$ level at the tailpipe during a calibratable period of time. As one example, the tailpipe $NO_x$ level limits may include a range such as from 1.6 g/kwh to 1.9 g/kwh (e.g. for Euro5 standard). It will be appreciated that the feedback control module periodically updates $NO_x$ level value with a calibrated rate.

Once evaluation of the $NO_x$ level has been performed, the feedback control module is configured to perform an error generation in a block 204 (Error Generation). In performing error generation, the feedback control module may set a target $NO_x$ range at the tailpipe as a command for the control system. In one embodiment, the target $NO_x$ range includes an upper value (Tailpipe $NO_{x\_}$Limit_Hi) and a lower value (Tailpipe $NO_{x\_}$Limit_Lo).

In one embodiment, the feedback control module compares the above evaluation of the $NO_x$ level or $NO_x$ emission with the target $NO_x$ range values, and generates an error. If $NO_x$ emission is higher than the upper value (i.e. Tailpipe $NO_{x\_}$Limit_Hi, then the error generated is: Tailpipe $NO_{x\_}$Limit_Hi-$NO_{x\_}$emission. Otherwise, if $NO_x$ emission is lower than $NO_{x\_}$Limit_Lo, then the error generated is $NO_{x\_}$Limit_Lo-$NO_{x\_}$emission. However, if $NO_x$ emission is within $NO_{x\_}$Limit_Hi and $NO_{x\_}$Limit_Lo, then the error is 0. (i.e. target value is within range).

In one embodiment, the feedback control module includes a proportional integral derivative (PID) controller in a controller block (FDBK Controller (P)) 205. It will be appreciated that the feedback control module is not necessary limited to a proportional-integral-derivative controller, and may be any suitable control feedback loop mechanism used in industrial control systems. Generally, the feedback control module is configured to correct an error between a measured process variable and a desired set point by calculating and then outputting a correction action that can adjust the process accordingly.

The PID controller is used to calculate a control signal, which is the weighing factor value, from the error values. The PID converts error values to control values (weighing factor values). By way of example only, if a weighing factor change of 0.2 (unitless) is desired, when an error of 0.5 g/kwh is present, a gain of 0.4 would be needed to do the calculation. In other examples, if there is a desire to accumulate the error for adjustment, an integrator may be used.

The result value generated in the controller block 205 is then further processed in a block 206 (Weighing Factor Generation). In the block 206, the system determines if the value generated in feedback control can be used as the weighing factor. In case of, e.g., sensor errors, or no update for a long time, when feedback values are not trustable, the system uses values generated using other means, e.g., using lookup tables, rather than that generated by the feedback controller. The weighing factor is generated using the feedback control module described above and the dosing control applies the weighing factor to the lower (feed-forward) and upper ("limit") limit dosing commands in generating the resulting dosing command.

As above, dosing control is configured to periodically update the resulting dosing command through the feedback control module. In another embodiment, the dosing control may be configured to include at least one look-up table as an input for generating the weighing factor if necessary, such as when the sensor fails or when the resulting dosing command is not updated for a period of time by the feedback control module. Some exemplary look-up tables may include but are not limited to an input of engine speed and an input of total fueling.

Among its benefits, the feedback control module is a "safe" control, since the resulting dosing command may only be adjusted within a range as allowed by emission requirements. Feedback control can be used to suitably adjust the resulting dosing command for uncertainties in SCR inlet NOx estimations and variations in system parameters due to ambient changes and catalyst aging. Different from previous feedback control designs, the feedback control herein does not control reductant dosing by directly using sensed $NO_x$, rather sensed $NO_x$ are processed to estimate emission level. The processed values are used to generate a weighing factor, which may be later updated or modified for periodically adjusting the resulting dosing command. That is, the feedback control module of the dosing control may modify dosing indirectly as needed, where the input for generating the command uses information gained from the exhaust output.

Turning to generation of the lower and upper limit dosing commands, FIGS. 4-9 show exemplary configurations that the dosing control may employ for generating the lower (feed-forward) and upper ("limit") limit dosing commands. In one embodiment, the lower limit dosing command is a calculation based on, for example, known emission requirements or targets for the exhaust system, and the upper limit dosing command is a calculation based on the maximum allowed ammonia slips.

Figure 4:
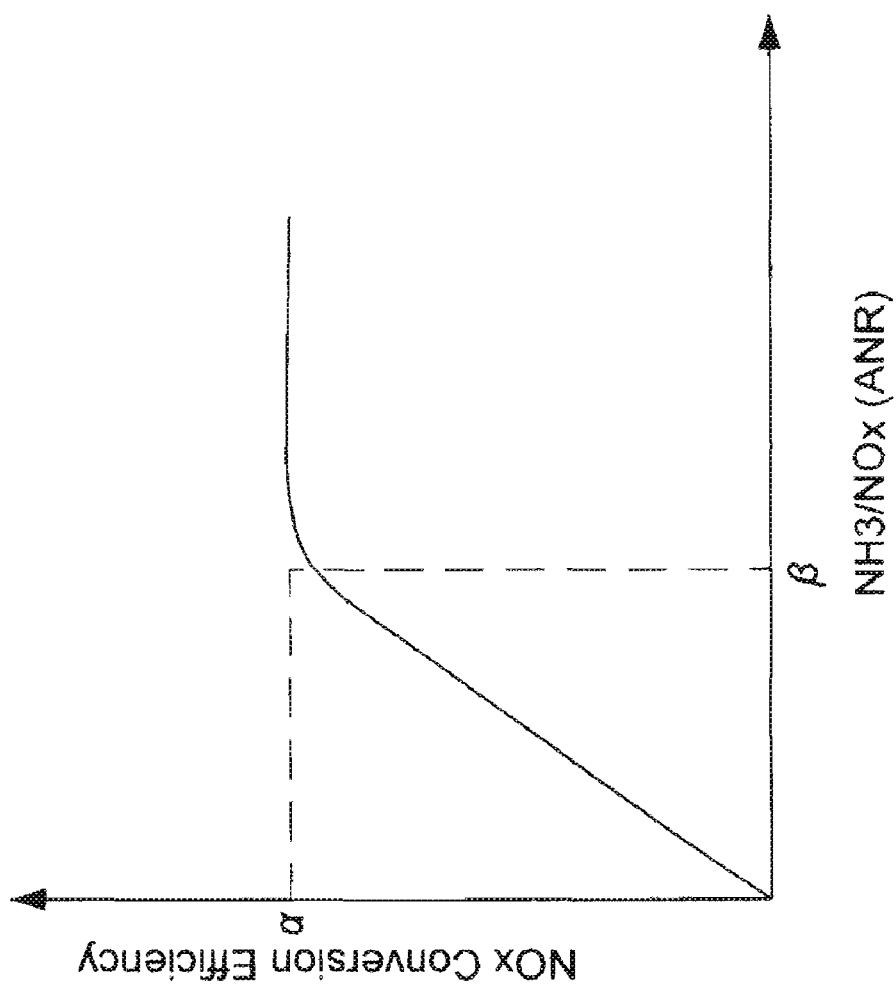
FIG. 4 is a graph showing a relationship between a NH$_3$ to NO$_x$ ratio (ANR) in reaction and NO$_x$ conversion efficiency.
Figure 5:
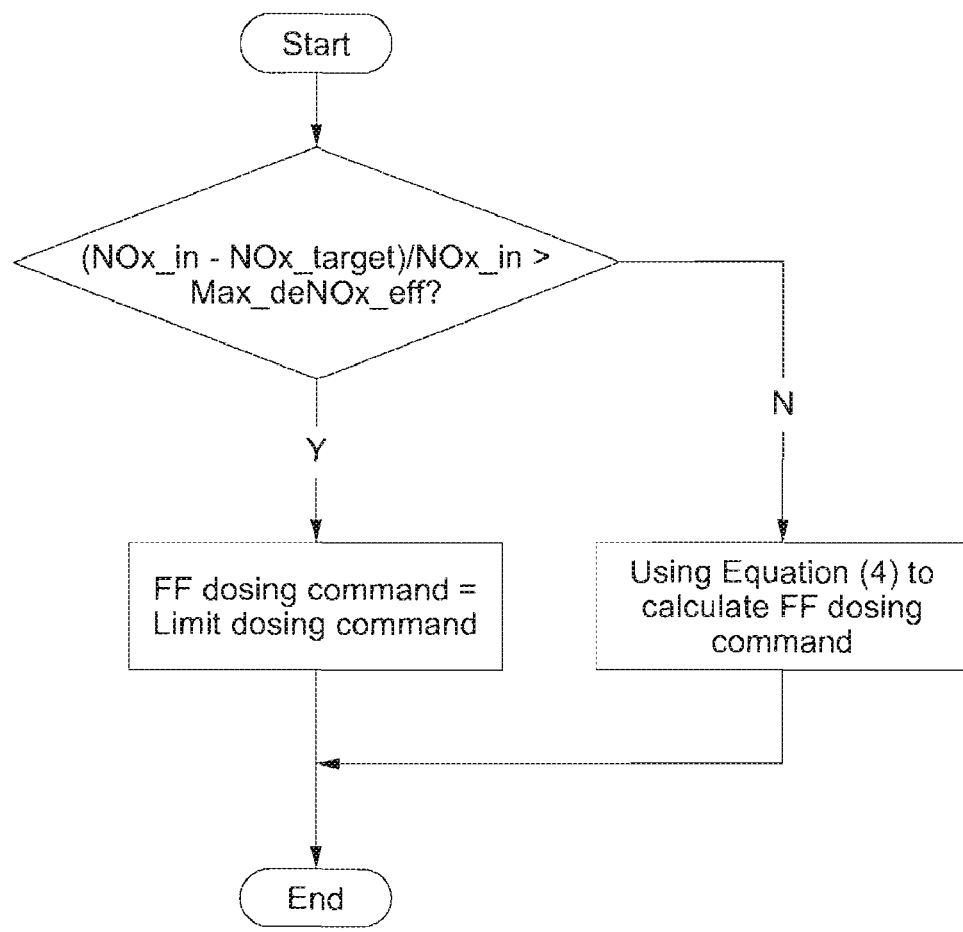
FIG. 5 is a schematic view of one embodiment of a procedure for determining a lower limit dosing command for use in generating a resulting dosing command.

FIG. 4 shows a relationship between a $NH_3$ to $NO_x$ ratio in reaction and $NO_x$ conversion efficiency. FIG. 5 shows a schematic view of one embodiment of a procedure for generating the lower limit dosing command. In one embodiment, the dosing control calculates the lower limit dosing command, which is referred as the needed dosing command or feed-forward dosing command (FF dosing command in FIG. 5). Generally, the feed-forward dosing command is calculated as the reference at which the system is able to meet the minimum required reductant dose (i.e. EPA requirements). For example, the feed-forward dosing command is based on temperature, exhaust flow, other engine operating conditions as known in the art, such as engine speed.

FIG. 4 shows a graph of a relationship between a $NH_3$ to $NO_x$ ratio in reaction and $NO_x$ conversion efficiency. In one embodiment for calculating the feed forward dosing command, the dosing control is configured to consider the following equations:

$$\eta = (C_{NH3}/C_{NOx})\alpha/\beta \quad \text{(Equation 2)}$$

where $\beta$ represents $NH_3$ to $NO_x$ ratio in reaction ($\beta$ changes with $NO_2/NO$ ratio);

$C_{NOx}$ represents $NO_x$ concentration at the SCR device inlet;

$C_{NH3}$ represents $NH_3$ concentration at the SCR device inlet (the lower limit dosing command is calculated using $C_{NH3}$)

$\alpha$ represents $deNO_x$ efficiency when ANR equals $\beta$ (ANR: Ammonia to $NO_x$ Ratio); and $\eta$ represents $deNO_x$ efficiency.

When the $NH_3/NO_x \leq \beta$, the following Equation 3 also may be considered by the dosing control.

$$C_{NOx}\eta = C_{NOx} - C_{Slip}^{NOx} \quad \text{(Equation 3)}$$

where $C_{NOx}\eta$ represents $NO_x$ reacted in catalyst;

$C_{NOx}$ represents $NO_x$ at the SCR device inlet; and $C_{Slip}^{NOx}$ represents $NO_x$ slip (emission) at the SCR device outlet.

However, where $NH_3/NO_x > \beta$, then the catalyst is not capable, as the feed forward command equals limit command, which is further described below with respect to FIG. 5.

According to equations (2) and (3), the $NH_3$ concentration $C_{NH3}$ is:

$$C_{NH3} = \beta(C_{NOx} - C_{slip}^{NOx})/\alpha \quad \text{(Equation 4)}$$

Turning back to FIG. 5, a procedure for the dosing control to generate the lower (feed-forward) limit dosing command is illustrated. A determination on whether the ($NO_{x\_}$in–$NO_{x\_}$ target)/$NO_x$_in>Max_$deNO_x$eff($\alpha$) is made. ("$NO_x$_in" is the $NO_x$ flow rate at the SCR inlet, while "$NO_x$_target" is the target $NO_x$ flow rate determined by emission requirements.) If yes (Y), then the catalyst is not capable ($NH_3/NO_x>\beta$), and the feed forward command equals the limit command. If no (N), then Equation 4 is used to calculate the lower limit or feed forward dosing command.

Figure 6:
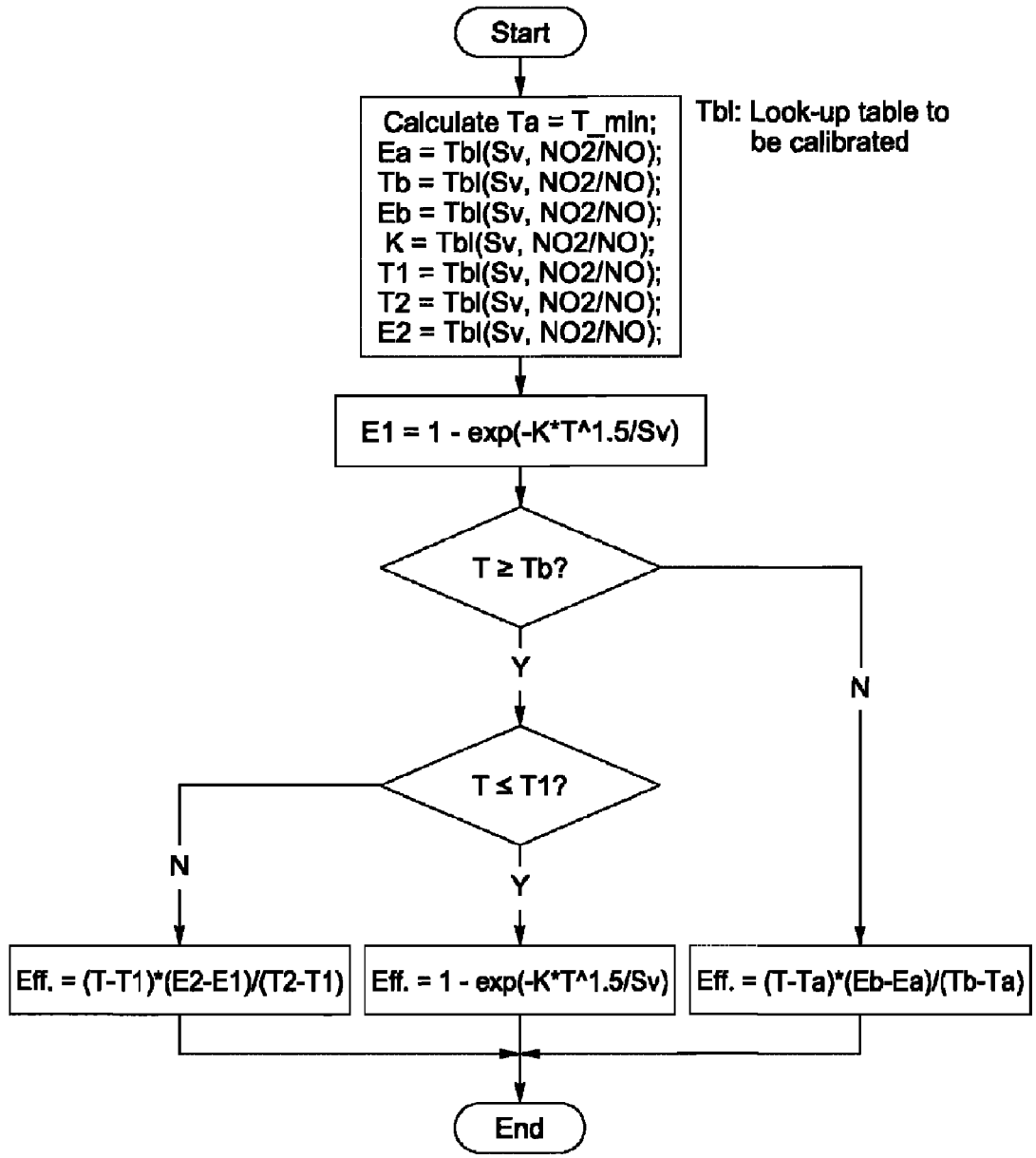
FIG. 6 is a schematic view of one embodiment of a procedure for calculating catalyst efficiency in determining an upper limit dosing command for use in generating a resulting dosing command.

FIG. 6 shows one example of such a procedure for a catalyst efficiency calculation for use in calculating the upper limit dosing command. In FIG. 6, Ta is defined as a low temperature limit for dosing (T_min). The limit Ta is a function of space velocity (Sv), which is calculated based on exhaust flow rate and catalyst size (Sv=Exhaust Volumetric Flow Rate/Catalyst Volume), and $NO_2$ to NO ratio: Ta=$f_a$ (Sv, $NO_2$/NO). The $NO_x$ conversion efficiency at ANR of $\beta$ and temperature of Ta is Ea, and Ea is also a function of space velocity and $NO_2$ to NO ratio: Ea=$g_a$ (Sv, $NO_2$/NO). The lightoff temperature in FIG. 6 is Tb. Tb is a function of space velocity and $NO_2$ to NO ratio: Tb=$f_b$ (Sv, $NO_2$/NO). The $NO_x$ conversion efficiency at ANR of $\beta$ and temperature of Ta is Eb, and similar as Ea, Eb=$g_b$ (Sv, $NO_2$/NO). A determination is made on whether T≧Ta, where T is the catalyst temperature. If no (N), then the catalyst efficiency calculation ends. If yes (Y), then a determination is made whether T≧Tb. If no (N), then a linear equation Eff.=(T−Ta)(Eb−Ea)/(Tb−Ta) is used to perform the efficiency calculation.

When catalyst temperature is too high, due to the oxidation of $NH_3$ back to $NO_x$, the $deNO_x$ conversion efficiency will decrease. T1 is defined as the temperature at which $deNO_x$ efficiency starts to decrease and T2 represents the high temperature limit for dosing, and as that for Ta and Tb, T1=$f_1$ (Sv, $NO_2$/NO), T2=$f_2$ (Sv, $NO_2$/NO). The deNOx efficiency at ANR of $\beta$ and temperature T1 is E1, E1=$g_1$ (Sv, $NO_2$/NO). The deNOx efficiency at ANR of $\beta$ and temperature T2 is E2, E2=$g_2$ (Sv, $NO_2$/NO). As further shown in FIG. 6, if the temperature T is in between T1 and Tb, then an equation Eff.=1−exp(−K*$T^{1.5}$/Sv) is used to perform the efficiency calculation, where K is a coefficient determined by Sv and $NO_2$/NO: K=$h_k$ (Sv, $NO_2$/NO). A linear equation, Eff.=(T−T1)(E2−E1)/(T2−T1), is used for calculating efficiency for catalyst temperature higher than T1 and lower than T2. If catalyst temperature higher than T2, dosing is disabled.

Figure 7:
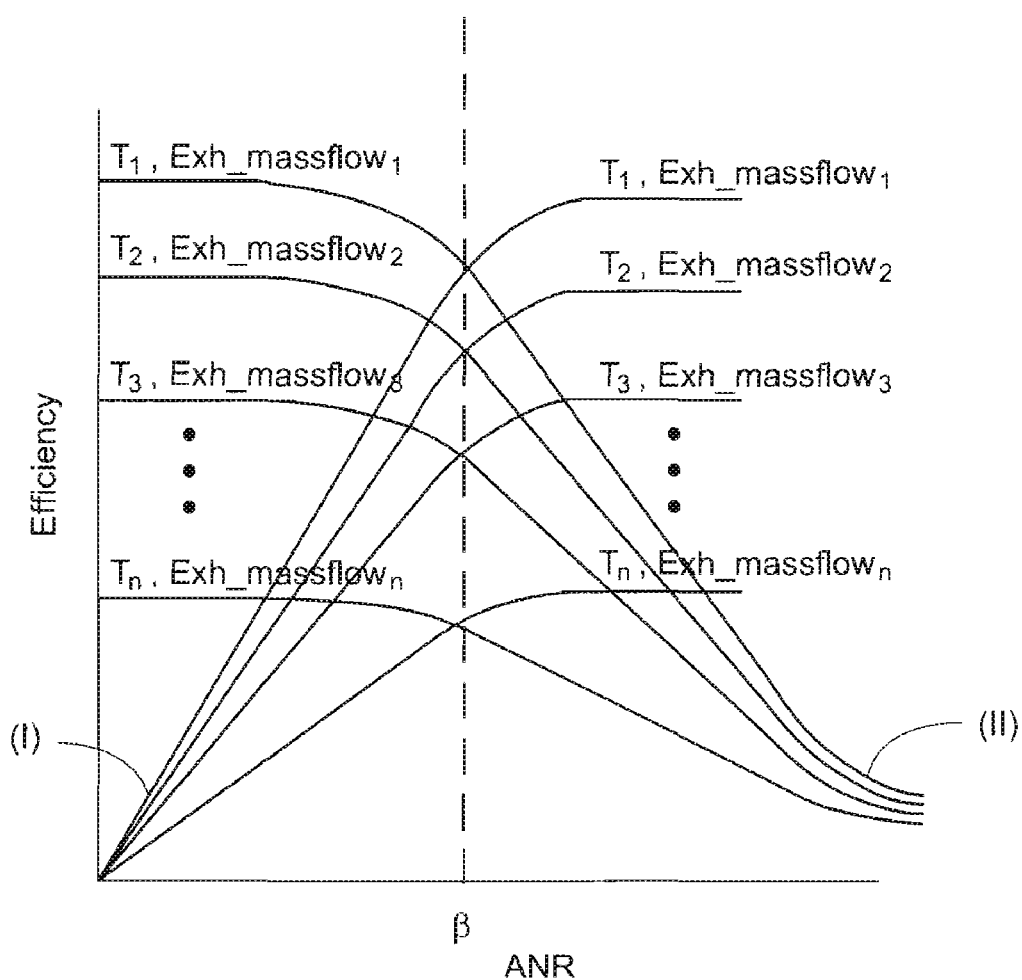
FIG. 7 is a graph showing a relationship between $NH_3$ to $NO_x$ ratio in reaction and each of deNOx efficiency and deNH3 efficiency.

It will be appreciated that the efficiency calculation may be an input of either or both the lower (feed-forward) and upper ("limit") limit dosing commands. The efficiency calculation as an input for the feed-forward dosing command is not shown, however, one of skill in the art would be able to determine an efficiency calculation as an input for calculating the feed-forward dosing command using known methods. Based on the $deNO_x$ efficiency at ANR of $\beta$ both $deNO_x$ efficiency and $deNH_3$ efficiency can be obtained. FIG. 4 shows the relationship between ANR and $deNO_x$ efficiency, while FIG. 7 is a graph showing a relationship between $NH_3$ to $NO_x$ ratio in reaction and both of deNOx efficiency (I) and $deNH_3$ efficiency (II). As one exemplary calculation, Equation 5 below may be employed for determining $deNH_3$ efficiency is:

$$deNH_3\_efficiency = deNO_x\_efficiency(\eta) * \beta/ANR \quad \text{(Equation 5)}$$

Turning specifically to the upper ("limit") limit dosing command, the dosing control design calculates the upper limit dosing command, which is also called the "limit" dosing command. Generally, the "limit" dosing command is calculated as the reference at which a maximum reductant dosage is allowed for the system.

As shown in the equations for calculating $deNO_x$ and $deNH_3$ efficiencies, an ANR value is needed for the calculation. However, in "limit" dosing command generation, the $NH_3$ concentration in the ANR (dosing level) is a term that is determined by using $deNO_x$ or $deNH_3$ efficiency. Consequently, a "loop" exists in the calculation process resulting in an equation that needs to be solved for obtaining the "limit" dosing command.

Figure 8A:
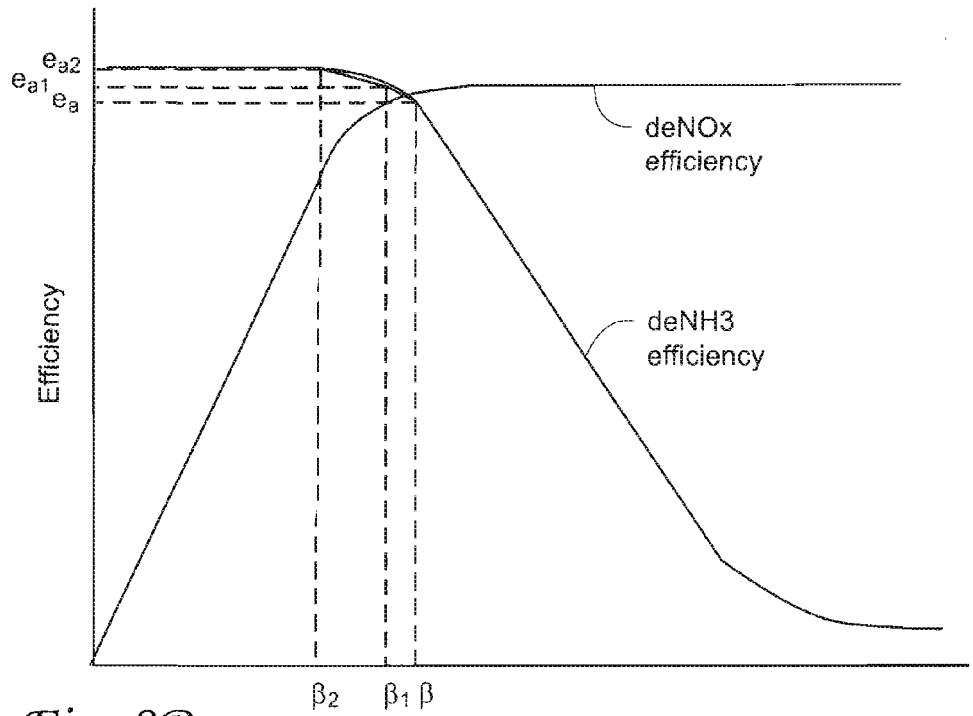
FIGS. 8A and 8B are a set of graphs showing a piece-wise linearization in a $deNH_3$ efficiency calculation.
Figure 8B:
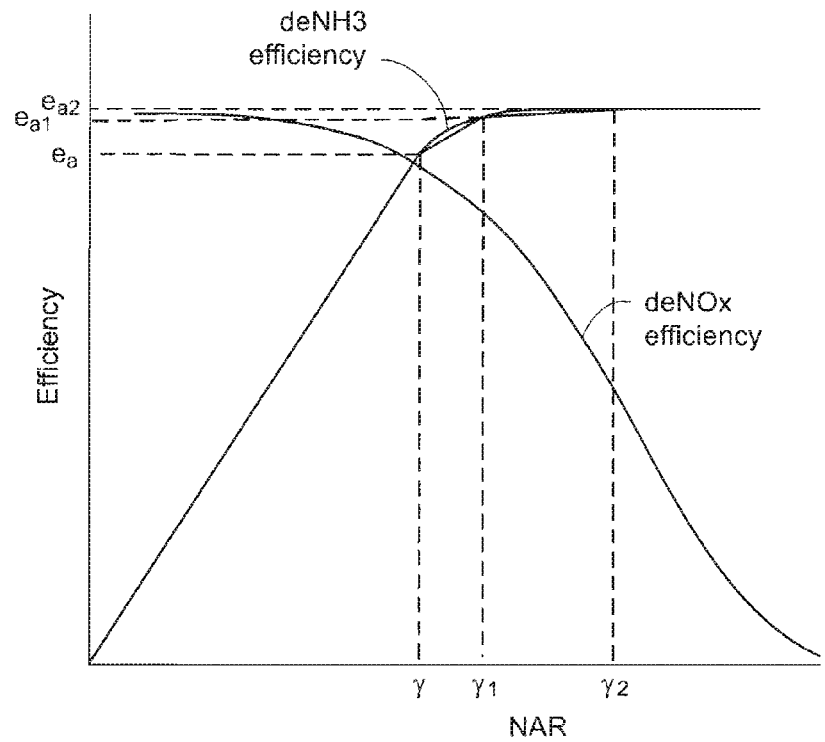

To avoid solving non-linear equations in SCR control, a piece-wise linearization method can be used. FIGS. 8A and 8B show a set of graphs showing the piece-wise linearization in $deNH_3$ efficiency calculation respectively using ANR and NAR. In FIG. 8A, $\beta$, $\beta_1$, and $\beta_2$ are break points; $e_a$, $e_{a1}$, and $e_{a2}$ are, respectively, the $deNH_3$ efficiency at $\beta$, $\beta_1$, and $\beta_2$. In FIG. 8B, NAR is $NO_x$ to Ammonia Ratio: NAR=1/ANR; $\gamma$, $\gamma_1$, and $\gamma_2$ are break points corresponding to $\beta$, $\beta_1$, and $\beta_2$: ($\gamma=1/\beta$, $\gamma_1=1/\beta_1$, $\gamma_2=1/\beta_2$). Using NAR for linearization avoids solving second-order equations in calculating "limit" dosing command and can provide a more accurate catalyst efficiency calculation.

Figure 9:
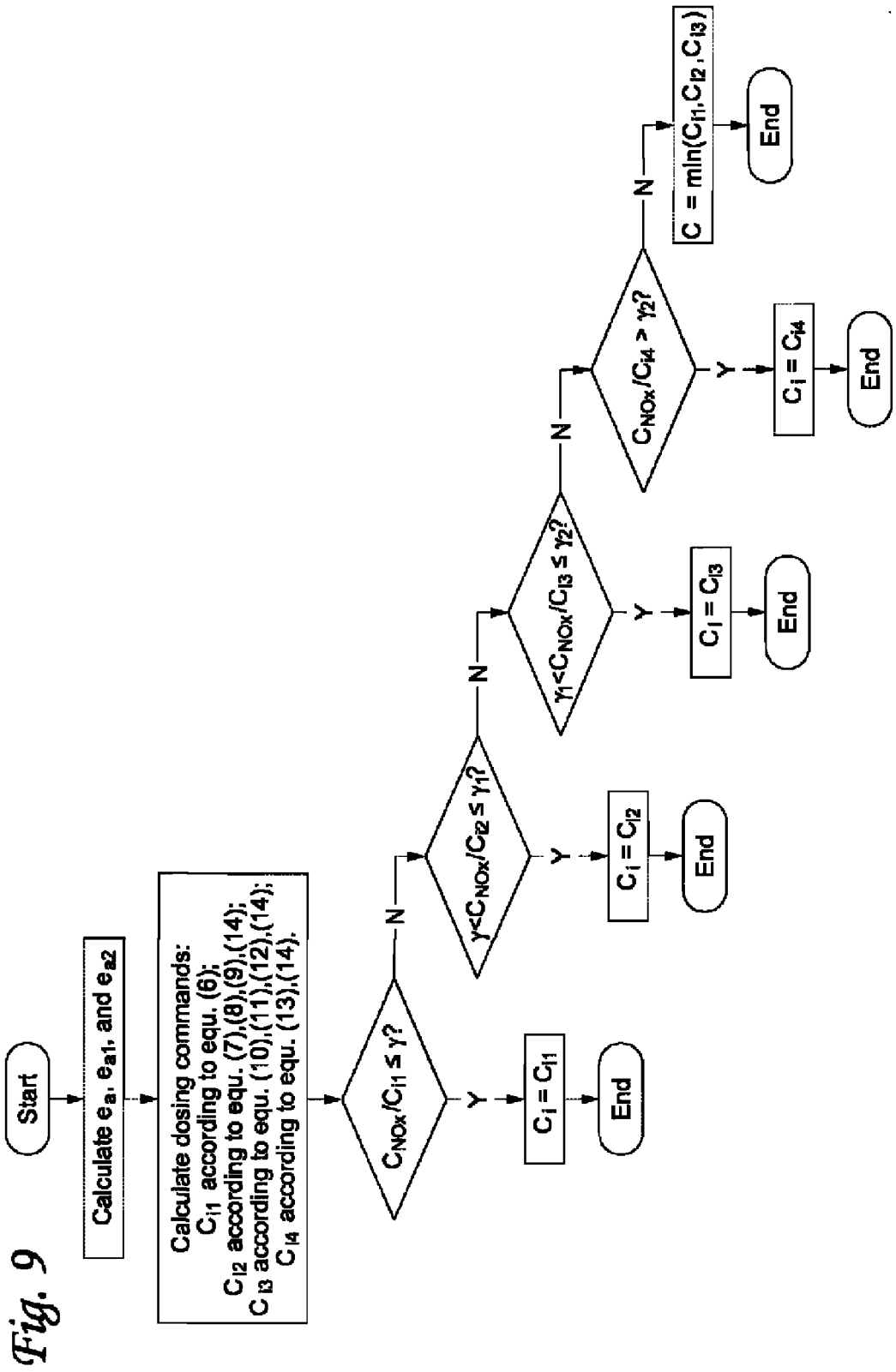
FIG. 9 is a schematic view of one embodiment of a procedure for calculating upper limit dosing command.

Referring to FIG. 9, the dosing control design may employ the following equations in generating the "limit" dosing command and incorporating $deNH_3$ efficiency as the basis for determining catalyst efficiency.

For example, when NAR≦$\gamma$ (i.e., ANR≧$\beta$), the $deNO_x$ efficiency is approximately constant at $\alpha$. The "limit" dosing command can be calculated using Equation 6:

$$C_{NH3} = C_{Slip}^{NH3} + \alpha\beta C_{NH3},$$

where $C_{slip}^{NH3}$ is the $NH_3$ slip at SCR outlet.

When NAR>$\gamma$, and more specifically, when $\gamma$<NAR≦$\gamma_1$, the $deNH_3$ efficiency is $\theta$ in the following Equation 7:

$$\theta = k_1(NAR) + b_1 \quad \text{(Equation 7)}$$

where in Equation 7, the coefficient $k_1$ and parameter $b_1$ are calculated, respectively, using Equation 8 and Equation 9:

$$k_1 = (e_a - e_{a1})/(\gamma - \gamma_1) \quad \text{(Equation 8)}$$

$$b_1 = e_{a1} - k_1\gamma_1; \quad \text{(Equation 9)}$$

and when $y_1$<NAR≦$\gamma_2$, the $deNH_3$ efficiency is $\theta$ in the following Equation 10:

$$\theta = k_2(NAR) + b_2 \quad \text{(Equation 10)}$$

where in Equation 10, the coefficient $k_2$ and parameter $b_2$ are calculated, respectively, using equation 11 and equation 12:

$$k_2 = (e_{a1} - e_{a2})/(\gamma_1 - \gamma_2) \quad \text{(Equation 11)}$$

$$b_2 = e_{a2} - k_2\gamma_2; \quad \text{(Equation 12)}$$

when NAR>$\gamma_2$, the $deNH_3$ efficiency is $\theta$ in the following Equation 13:

$$\theta = e_{a2}. \quad \text{(Equation 13)}$$

The limit dosing command can be calculated using the following Equation 14:

$$C_{NH3} = C_{Slip}^{NH3} + \theta C_{NH3} \quad \text{(Equation 14)}$$

Above, k1, k2, b1, and b2 are results calculated by using equations 7-12. For example, k1 and k2 functionally are slopes in linear fitting equations for $deNH_3$ efficiency, and b1 and b2 functionally are bias values: $deNH_3$ efficiency=k*(NOx/NH3)+b.

With further reference to FIG. 9, a schematic view of one example of a procedure for calculating the "limit" dosing command is shown. As discussed, the dosing control generates the "limit" dosing command (see FIG. 1) through a series of calculations and value determinations. In one embodiment, $e_a$, $e_{a1}$, and $e_{a2}$ are calculated. Then, the dosing commands are calculated as $C_{i1}$, $C_{i2}$, $C_{i3}$, and $C_{i4}$ where $C_{i1}$ is the $NH_3$ dosing level $C_{NH3}$ calculated according to Equation 6;

$C_{i2}$ is the $NH_3$ dosing level $C_{NH3}$ calculated according to Equations 7, 8, 9, and 14;

$C_{i3}$ is the $NH_3$ dosing level $C_{NH3}$ calculated according to Equations 10, 11, 12 and 14, and $C_{i4}$ is the $NH_3$ dosing level $C_{NH3}$ calculated according to Equations 13 and 14.

After the dosing commands are calculated, the following determination steps are performed to choose a valid value from $C_{i1}$, $C_{i2}$, $C_{i3}$, and $C_{i4}$. A determination is made as to whether $C_{NOx}/C_{i1}$ (NAR) is less than or equal to gamma ($\gamma$). If yes (Y), then $C_{i1}$ is valid, and the value of $C_{i1}$ is used for generating the "limit" dosing command $C_i$. If no (N), then a determination is made as to whether $C_{NOx}/C_{i2}$ is higher than gamma ($\gamma$), but lower than or equal to gamma 1 ($\gamma_1$). If in this determination the result is yes (Y), then the value of $C_{i2}$ is used for calculating the upper "limit" dosing command $C_i$. If in this determination, the result is no (N), then a determination is made as to whether $C_{NOx}/C_{i3}$ is higher than gamma 1 ($\gamma_1$), but lower than or equal to gamma 2 ($\gamma_2$). If in this determination, the result is yes (Y), then the value of $C_{i3}$ is selected. If no (N), then a determination is made as to whether $C_{NOx}/C_{i4}$ is higher than gamma 2 ($\gamma_2$). If in this determination, the result is yes (Y), then the value of $C_{i4}$ is selected. If the result is no (N), then result value $C_i$ for "limit" dosing command generation is the minimum of $C_{i1}$, $C_{i2}$, $C_{i3}$, and $C_{i4}$.

As described, the upper limit dosing command is generated using linear calculations in at least one ANR regions. Further, in following the linear calculations, a result examination process, which examines if the assumptions for the linear calculations are valid, is used for selecting the valid linear calculation result as the upper limit dosing command.

It will be appreciated that when NAR>$\gamma$, or ANR$\leq\beta$ (normal dosing range), the $deNH_3$ efficiency is not sensitive to ANR or NAR change (FIG. 7 and FIG. 8). As a result, the "limit" dosing command is not sensitive to uncertainties in $NO_x$ sensing value at SCR inlet. A tradeoff thus exists between dosing economy ("limit" dosing command is higher than "feed-forward" dosing command) and system robustness to uncertainties in SCR inlet $NO_x$ estimate ("limit control is less sensitive to uncertainties in SCR inlet $NO_x$ estimate).

Referring back to the weighing factor, once the lower and upper limit dosing commands have been generated, the weighing factor is applied to the lower (feed-forward) limit dosing command and the upper ("limit") limit dosing command in generating the resulting dosing command. In one embodiment, the weighing factor may be applied to the upper limit dosing command in a product of the upper limit dosing command (limit cmd) and the weighing factor (factor), the value of which is within 0 to 1, according to the formula:

limit cmd*factor.

For the lower limit dosing command, the weighing factor may be applied to the lower limit dosing command in a product of the lower limit dosing command (feed-forward cmd) and the difference of 1 and the weighing factor (1−factor), according to the formula:

feed-forward cmd*(1−factor).

The resulting dosing command is the sum of these two values:

Resulting dosing command=feed-forward cmd*(1−factor)+limit cmd*factor.

Since the feed-forward dosing command is always equal or lower than the "limit" command, the above equation sets the resulting dosing command within the range determined by the lower (feed-forward) and upper ("limit") commands. Thus, the resulting dosing command (or actual dosing instruction) to the doser is a specific dosing rate value within the lower and upper limits, and drawn from the range determined by the lower and upper limit commands which appears inside the controller.

Figure 10:
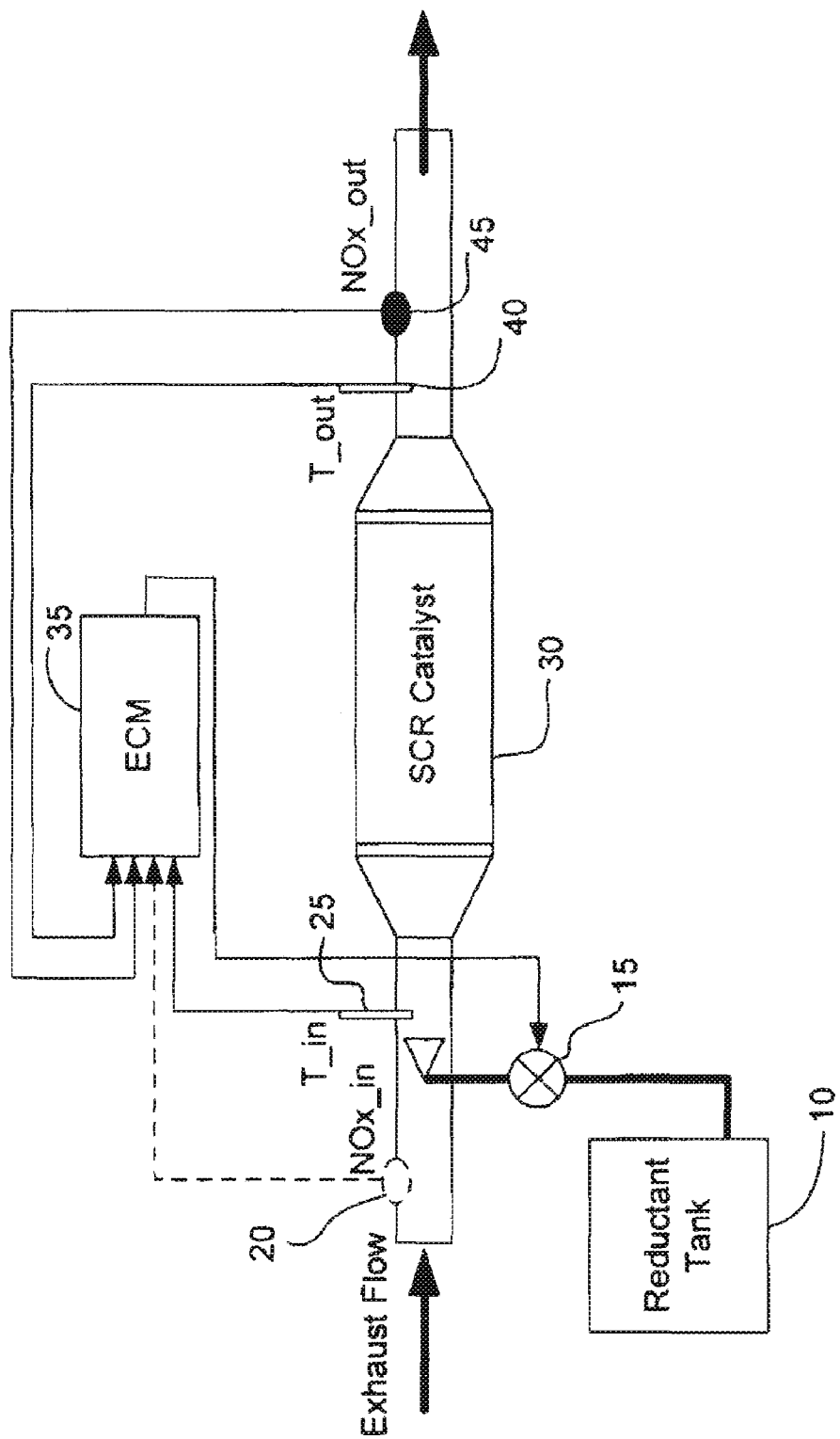
FIG. 10 illustrates a schematic representation of a general selective catalyst reduction exhaust system as known in the art.

Turning to FIG. 10, a schematic representation of a general selective catalyst reduction device as known in the art is shown, but incorporated with a dosing control in accordance with the inventive concepts described. In one embodiment of such a device, exhaust air generated in an engine (not shown in the figure) flow through a SCR catalyst 30 for reducing NOx emission. A $NO_x$ sensor 20 (or $NO_x$ estimate, a.k.a. virtual sensor) is at the upstream of the SCR catalyst 30 for detecting $NO_x$ level at SCR inlet ($NO_x$_in). And a temperature sensor 25 is used to measure exhaust air temperature at SCR inlet (T_in). At the downstream of the SCR catalyst 30, a $NO_x$ sensor 45 is installed for sensing tailpipe $NO_x$ slip that is used in the feedback control. Another temperature sensor 40 at the downstream of the SCR catalyst 30 is used together with the SCR inlet temperature sensor 25 for better estimation of the SCR catalyst temperature. All sensors (temperature sensors 25 and 40 and NOx sensors 20 and 45) are connected to an Engine Control Module (ECM), which has the dosing controller running inside. Based on the sensing information, the ECM generates a resulting dosing command and sends the instruction to an injection system 15 that injects a reductant (i.e. urea) from a tank 10 into the SCR catalyst 30.

As described, the dosing control is used for introducing a reductant to reduce $NO_x$ exhaust material, such as that generated by an exhaust system employing a selective catalyst device. In one embodiment of the dosing control, a $NO_x$ sensor is disposed downstream of an SCR device (such as the $NO_x$ sensor 45). The sensor is operatively connected to a controller. It will be appreciated that the controller may be run in a central processing unit (such as the ECM 35) configured to carry out the control functions described, and may be configured to be activated manually or automatically as one of skill in the art could accomplish. As described, the controller receives the output of the sensors, and generates a weighing factor accordingly to be used in processing lower (feed-forward) limit and upper ("limit") limit dosing commands. As one example, the SCR outlet $NO_x$ sensor and weighing factor generation are configured in a feedback control module of the dosing control, where a $NO_x$ level output from the selective catalyst device is used to produce the weighing factor to be used for adjusting the resulting dosing command. The resulting dosing command is then used as an instruction to the SCR device, where the controller delivers the instruction to an injection system such as a doser and a doser driver, so that the doser and doser driver may introduce a reductant into the exhaust system.

In one embodiment, the reductant to be introduced is urea. It will be appreciated, however, that other reductants may be employed if desired or necessary. It further will be appreciated that the dosing control described may be easily calibrated to function with multiple SCR configurations and engines.

As above, $NH_3$ slips are unwanted emissions. This is because too much $NH_3$ slip creates an undesirable smell (e.g. at more than 25 ppm), as a by-product of SCR reactions. Further, reductant overdosing causes dosing inefficiency and possible false positive feedback due to cross-sensitivity of $NO_x$ sensors. As a result, a maximum dosing command could become saturated (too much reductant is released). However, the dosing control as described herein is configured, such that the upper limit dosing command of the resulting dosing command is dependent upon a maximum allowed ammonia $NH_3$ slips (i.e. the limit command) so as to avoid such undesired consequences. For example, the $NH_3$ slip may be maintained to about 25 ppm or less.

Among its benefits, the feedback control module is a "safe" control, since the resulting dosing command may only be adjusted within a range as allowed by emission requirements and further limited by the weighing factor. Feedback control can be used to suitably adjust the resulting dosing command for uncertainties in SCR inlet $NO_x$ estimations and for variations in system parameters due to ambient changes and catalyst aging. Different from previous feedback control designs, the feedback control herein does not control reductant dosing by directly using sensed $NO_x$, rather sensed $NO_x$ are processed to estimate emission level. The processed values are used to generate a weighing factor, which may be later updated or modified for periodic adjusting of the resulting dosing command. That is, the feedback control module of the dosing control may modify dosing indirectly as needed, where the input for generating the command uses information gained from the exhaust output. The feedback control herein further uses a linear method without requiring an iterative process for solving equations, as shown for example in calculating the upper ("limit") dosing commands.

The inventive concepts disclosed herein may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

We claim:

1. An apparatus for generating a dosing command for introducing a reductant into an exhaust system comprising:
    at least one sensor configured to detect $NO_x$ produced during engine combustion; and
    a controller operatively connected with the at least one sensor, the controller configured to receive an output of the at least one sensor based on the $NO_x$ detected by the at least one sensor, the controller configured to process the output from the at least one sensor and generate a resulting dosing command having an instruction to introduce a reductant into the exhaust system, the resulting dosing command including a lower limit dosing command, an upper limit dosing command, and a weighing factor, the weighing factor configured to be applied to the lower and upper limit dosing commands in a calculation to provide the resulting dosing command, such that the resulting dosing command is a value within end values of the lower and upper limit dosing commands.

2. The apparatus of claim 1, wherein the at least one sensor is operatively connected to an outlet of the exhaust system.

3. The apparatus of claim 1, wherein the controller comprises a feedback control module configured to receive the output from the at least one sensor and generate the weighing factor.

4. The apparatus of claim 3, wherein the feedback control module is configured to adjust the weighing factor and apply the weighing factor to the lower and upper limit dosing commands.

5. The apparatus of claim 3, wherein the feedback control module is a proportional-integral-derivative controller.

6. The apparatus of claim 1, wherein the controller is configured to periodically update the resulting dosing command.

7. The apparatus of claim 1, wherein the controller further comprising at least one look-up table as an input for generating the weighing factor when the at least one sensor fails or when the resulting dosing command is not updated for a period of time.

8. The apparatus of claim 7, wherein the look-up table comprising an engine speed input and a total fueling input.

9. The apparatus of claim 1, wherein the weighing factor, a value of which varies between 0 and 1, applied to the upper limit dosing command comprising a product of the upper limit dosing command (limit cmd) and the weighing factor (factor), according to the formula:

$$\text{limit cmd} * \text{factor, and}$$

the weighing factor applied to the lower limit dosing command comprising a product of the lower limit dosing command (feedforward cmd) and the difference of 1 and the weighing factor (1−factor), according to the formula:

$$\text{feed-forward cmd} * (1 - \text{factor}).$$

10. The apparatus of claim 1, wherein the lower limit dosing command comprising a calculation based on an emission target for the exhaust system, and the upper limit dosing command comprising a calculation based on a maximum allowed ammonia slip.

11. The apparatus of claim 10, wherein the maximum allowed ammonia slip is about 25 ppm or less.

12. The apparatus of claim 1, wherein the upper limit dosing command is generated based on linear calculations of at least one ammonia to $NO_x$ ratio.

13. The apparatus of claim 12, wherein the upper limit dosing command is generated based on a result examination process configured to examine whether the linear calculations are valid, and configured to select a valid linear calculation result as the upper limit dosing command.

14. A method of generating a dosing command to introduce a reductant into an exhaust system comprising:
    detecting $NO_x$ produced during engine combustion with a sensor;
    receiving an output of the $NO_x$ detected by the sensor with a controller;
    processing the output with the controller to generate a dosing command that comprises:
        calculating a lower limit dosing command with the controller, the lower limit dosing command comprising a calculation based on a maximum allowed $NO_x$ emission for the exhaust system;
        calculating an upper limit dosing command with the controller, the upper limit dosing command comprising a calculation based on a maximum allowed ammonia slip;
        generating a weighing factor with the controller, the weighing factor comprising a calculation based on a detected $NO_x$ output;
        processing the lower limit and upper limit dosing commands with the controller using the weighing factor; and
        generating a resulting dosing command with the controller based on a calculation of the processed lower limit and upper limit dosing commands, the resulting dosing command being a value within end values of the lower and upper limit dosing commands.

15. The method of claim 14, wherein generating the weighing factor comprising receiving an output from the sensor using a feedback control module, calculating the weighing factor using the output from the sensor, and delivering the weighing factor to the controller to process the lower limit and upper limit dosing commands using the weighing factor.

16. The method of claim 14, wherein generating the resulting dosing command comprises periodically updating the resulting dosing command.

17. The method of claim 14, wherein generating the resulting dosing command comprises using at least one look-up table as an input for generating the weighing factor when the sensor fails or when the resulting dosing command is not updated for a period of time.

18. The method of claim 17, wherein the look-up table comprising an engine speed input and a total fueling input.

19. The method of claim 14, wherein the lower limit dosing command comprising a calculation based on an emission target for the exhaust system, and the upper limit dosing command comprising a calculation based on a maximum allowed ammonia slip.

20. The method of claim 19, wherein the maximum allowed ammonia slip is about 25 ppm or less.

21. The method of claim 14, wherein calculating the upper limit dosing command further comprises performing linear calculations of at least one ammonia to $NO_x$ ratio.

22. The method of claim 21, further comprising examining the validity of assumptions for the linear calculations, and selecting a valid linear calculation result as the upper limit dosing command.

23. A selective catalyst reduction exhaust system comprising:
- a selective catalyst reduction device including an inlet and an outlet;
- at least one sensor operatively connected to the outlet of the selective catalyst reduction device, the at least one sensor configured to detect $NO_x$ produced during engine combustion;
- a controller operatively connected with the at least one sensor, the controller configured to receive an output of the at least one sensor based on the $NO_x$ detected by the at least one sensor, the controller configured to process the output from the at least one sensor and generate a resulting dosing command having an instruction to introduce a reductant into the exhaust system, the resulting dosing command including a lower limit dosing command, an upper limit dosing command, and a weighing factor, the weighing factor configured to be applied to the lower and upper limit dosing commands, the weighing factor configured to convert the lower and upper limit dosing commands to end values of the resulting dosing command; and
- a doser operatively connected to the controller and connected to the selective catalyst reduction device, the doser configured to receive the resulting dosing command and configured to introduce the reductant into the exhaust system at the inlet of the selective catalyst reduction device and based on the resulting dosing command.

24. An exhaust system comprising the apparatus of claim 1;
- a selective catalyst reduction device that includes an inlet and an outlet, where the at least one sensor is connected to the outlet; and
- a doser operatively connected to the controller and connected to the selective catalyst reduction device, the doser is configured to receive the resulting dosing command and is configured to introduce the reductant into the inlet of the selective catalyst reduction device and based on the resulting dosing command.

* * * * *